United States Patent [19]

Harris et al.

[11] 4,203,497
[45] May 20, 1980

[54] PORTABLE LOAD SCALE FOR MINING TRUCKS AND THE LIKE

[75] Inventors: Carl R. Harris, Lynnwood; Robert W. Blaylock, Bothell, both of Wash.

[73] Assignee: Evergreen Weigh, Inc., Lynnwood, Wash.

[21] Appl. No.: 927,581

[22] Filed: Jul. 24, 1978

[51] Int. Cl.² .................. G01G 19/02; G01G 21/28
[52] U.S. Cl. .................................. 177/134; 177/244
[58] Field of Search ............... 177/134, 135, 145, 244

[56] References Cited

U.S. PATENT DOCUMENTS

| | | | |
|---|---|---|---|
| 3,381,767 | 5/1968 | Rairigh | 177/126 |
| 3,474,875 | 10/1969 | Laimins | 177/134 |
| 3,661,220 | 5/1972 | Harris | 177/136 |

Primary Examiner—George H. Miller, Jr.
Attorney, Agent, or Firm—Graybeal & Uhlir

[57] ABSTRACT

An improved load scale of the type wherein a platform supporting a vehicle and a load to be weighed has a plurality of load cells disposed under and across each end of the pair of opposed ends and between the platform and a supporting surface. The improvement comprises a plurality of Z-shaped lateral support beams with each beam having an upper flange and a lower flange thereon. The plurality of Z-shaped lateral support beams extend across each end of the pair of opposed ends of the platform between the platform and the plurality of load cells such that the lower flange of the support beam carries the platform and is secured thereto, and the upper flange of the support beam spans the gap between adjacent load cells and rests across the tops thereon. A further improvement comprises a weight distribution means with a first base plate disposed upon the support surface with a plurality of second base plates being disposed above said first base plate and being separated therefrom by a sheet of material having a non-linear compression characteristic.

25 Claims, 4 Drawing Figures

PORTABLE LOAD SCALE FOR MINING TRUCKS AND THE LIKE

DESCRIPTION

1. Technical Field

The present invention relates in general to load scales and more particularly to a load scale adapted to weigh vehicles.

2. Background Art

The necessity to weigh vehicles, especially large vehicles such as mining trucks, bottom dump trailers, and the like, arises for a number of reasons. First, these vehicles are often weighed to avoid overloading the vehicle's axles or tires (typically costing several thousand dollars). Second, if such a vehicle in its loaded condition travels over highways, particularly overpasses, bridges, or the like, shared by passenger carrying automobiles, various local, state, and federal laws set maximum load limit requirements for such vehicles using these highways. Finally, by maximizing the load carrying capability of such vehicles within these load limit requirements, the operational productivity for the vehicle is increased.

Vehicle load scales of the type necessary to weigh such vehicles including their loads are old in the art. A typical vehicle load scale consisted of a platform formed by a plurality of I-shaped beams with the platform having a plurality of load cells disposed under a pair of opposed ends. Load cells, particularly of the type consisting of large metal bars having a thick center section and cantilevered ends, such as shown in U.S. Pat. No. 3,661,220 issued to Harris, are also old in the art. Basically, the cantilivered ends of the load cells deflect or bend in response to a weight applied atop the center section of the bar. By measuring the stress in the cantilivered bar in response to such a weight, and by comparing that stress with the stress produced by a predetermined unit weight applied to the center-section, the weight on the load cell can be determined. A vehicle and load to be weighed was driven on the platform, the stress in the load cell was measured, and the total vehicle and load weight was established.

This type of scale had several disadvantages. Due to the cumulative cross-sectional dimensions of the platform and the load cells, the scale was substantially elevated from the weighing or supporting surface making it difficult for the vehicles to be placed upon the platform. To compensate, pits were dug with the platform and load cells being placed therein, thereby making the upper surface of the platform flush with the surrounding surface, usually the earth's surface. This operation made the scale less portable and more difficult to set up, especially at remote sites.

Another scale used in the prior art employed a similar platform formed from I-shaped beams and having an angle member extending across each end of the platform abutting the ends of each I-shaped beam and welded thereto. The load cells were then placed under the flange of each angle member. This type of scale was more portable than those that had previously existed, but had vehicle and load weight limitations. Use of the angle member placed the weld existing between the platform and the angle member in a high stress area. Since only a limited amount of weld is practical, this type of scale had inherent vehicle and load weight limitations of about fifty thousand pounds per platform. If large vehicles were placed on the platform, these welds could fracture and result in a collapse of the platform. In addition, the load cells could be compressed into the supporting surface making accurate weighing impossible.

The present invention overcomes these problems of the prior art by providing a one-piece extruded, Z-shaped, lateral support beam having an upper flange and a lower flange thereon disposed across a pair of opposed ends of the platform. In one embodiment of the present invention, the Z-shaped lateral support beam is extruded from aluminum alloy and heat treated to produce a lightweight beam having a high strength factor. The platform is carried by the lower flange of the beam with the upper flange spanning the gap between adjacent load cells and resting atop the cells. Since the lower flange of the Z-shaped lateral support beam carries the platform and is secured thereto, such as by welding or the like, any weld between the platform and the lateral support beam is in a low stress area. As a new and surprising result, load scales made according to the present invention are significantly lighter in weight that scales shown in the prior art and have a vehicle capacity of about two hundred fifty thousand pounds per platform, an improvement of about five-to-one from the aforementioned load scales. In addition, the Z-shaped lateral support beam resting atop adjacent load cells results in a load scale having a minimal elevation above the supporting surface thereby obviating the need for excavation of a pit or the like. This feature produces a load scale which is easily portable and permits rapid set up and operation at remote, off-road locations.

DISCLOSURE OF THE INVENTION

According to one aspect of the present invention, the improvement in a load scale of the type wherein a platform supporting the vehicle and load to be weighed has a plurality of load cells disposed under and across a pair of opposed ends thereof and between the platform and a supporting surface, includes a plurality of Z-shaped lateral support beams extending across the ends of the platform. Each Z-shaped lateral support beam has an upper flange and a lower falnge thereon, and is disposed between the platform and the plurality of load cells such that the lower flange of the support beam carries the platform and is secured thereto, and the upper flange of the support beam spans the gap between adjacent load cells and rests across the tops of the load cells.

According to another aspect of the present invention, a load scale having a platform and a plurality of load cells disposed under and across a pair of opposed ends thereof and between the platform and a supporting surface includes a plurality of Z-shaped lateral support beams extending across the ends of the platform. Each Z-shaped lateral support beam has an upper flange and a lower flange thereon and is disposed between the platform and load cells such that the lower flange of the support beam carries the platform and is secured thereto, and the upper flange of the support beam spans the gap between adjacent load cells and rests across the tops thereof. A plurality of weight distribution means are disposed between the supporting surface and each load cell with the members of the weight distribution means disposed closer to the load cells being of a smaller horizontal surface area than members of the means disposed closer to the supporting surface.

The foregoing and other objects, features, and advantages of the present invention will become apparent in light of the detailed description of preferred embodiments thereof set forth hereafter, and illustrated in the accompanying drawings.

BEST MODE OF CARRYING OUT THE INVENTION

Figure 1:
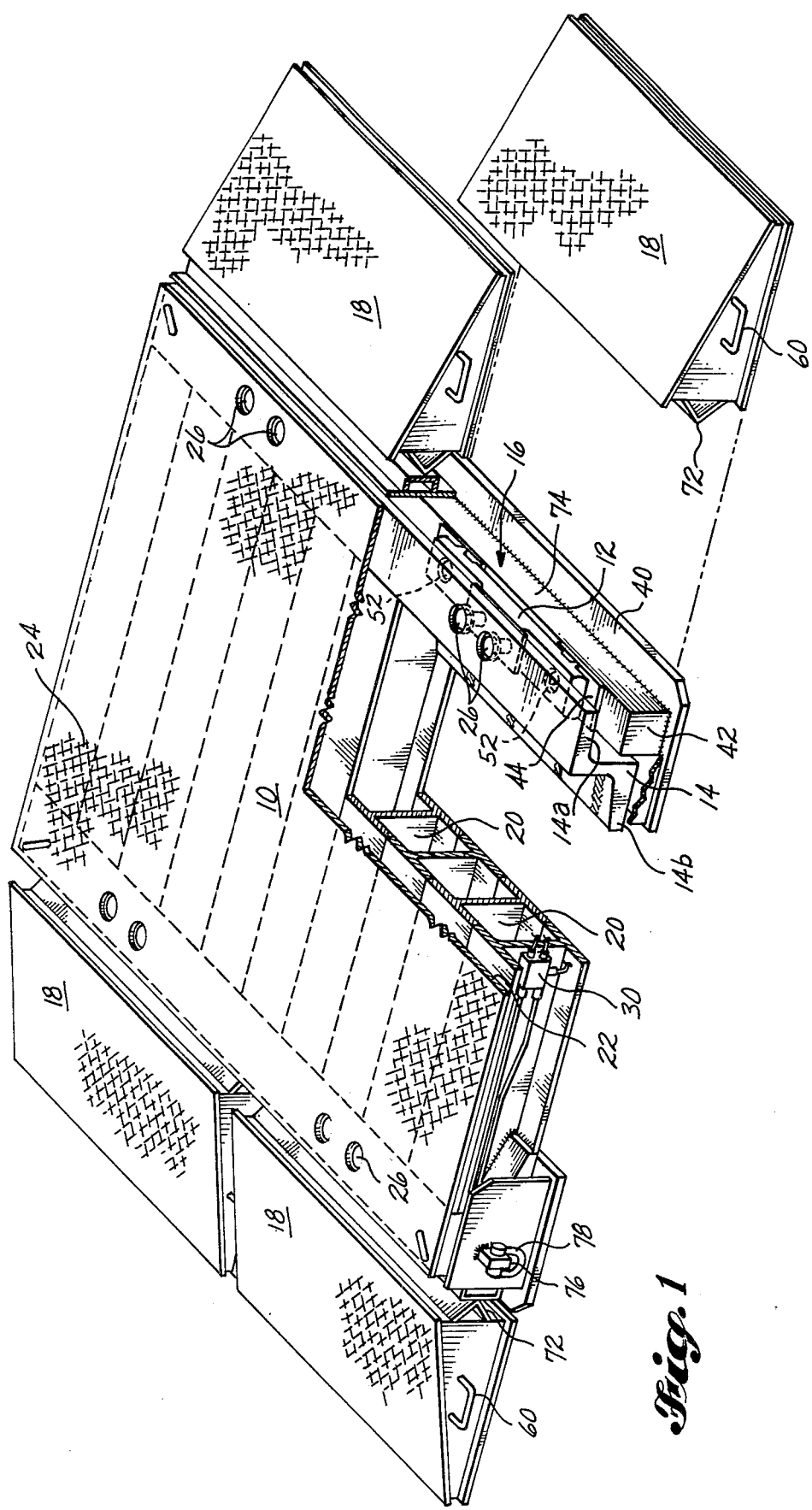
FIG. 1 is a perspective view, partially broken away for the sake of clarity, of a typical load scale according to the present invention.

In one embodiment of the present invention, as shown in FIG. 1, the load scale comprises a platform 10, a plurality of load cells 12 disposed under and across each end of the platform and between the platform and a supporting surface, a plurality of Z-shaped lateral support beams 14 extending across a pair of opposed ends of the platform between the platform and the load cells, a weight distribution means, shown generally at 16, disposed between the supporting surface and the load cells, and a plurality of ramp members 18 disposed upon the supporting surface adjacent each Z-shaped lateral support beam.

As shown in FIG. 1, the platform 10 comprises a plurality of wide flanged beams 20 arranged adjacent each other and in a plane such that the edges of the flanges of one beam abut the edges of the flanges of the adjacent beam. It is to be understood that other embodiments of the platform may be used to practice the present invention, such as by having the wide flanged beams 20 arranged adjacent each other in a plane with a separation between adjacent beams and the flanges thereon. The platform 10 has an upper surface 22 extending across the entire width and length of the platform 10, with a portion of the upper surface 22 extending over the upper flange 14A of each Z-shaped lateral support beam 14 and being in contact therewith. It is to be understood, however, that other embodiments of the upper surface 22 may be used without departing from the spirit and scope of the present invention, such as by providing an upper surface flush with the upper flange, or slightly recessed with respect to the upper flange. The upper surface 22 has a tread pattern disposed thereon, shown generally at 24, to provide traction for the vehicle tires as the vehicle is driven on and off the platform 10. Platform 10 has a plurality of holes 26 disposed at locations across opposed ends thereof to facilitate securing the Z-shaped lateral support beams 14 to the plurality of load cells 12. Both the plurality of wide flanged beams 20 and upper surface 22 of platform 10 may be constructed from any suitable material, such as steel, aluminum, or the like having sufficient strength to support the vehicle and load when they are disposed at the center of platform 10.

Figure 2:
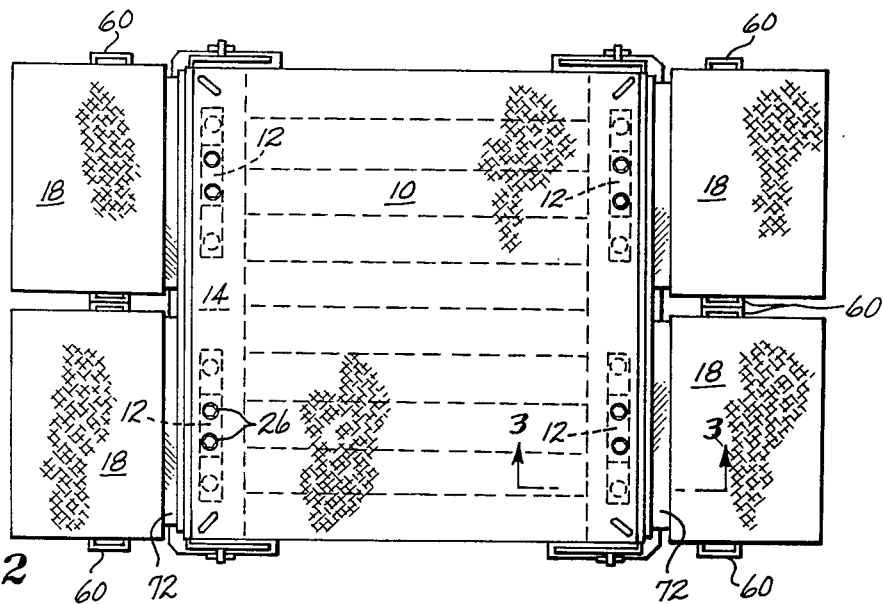
FIG. 2 is a top view of a typical load scale according to the present invention.

A plurality of load cells 12 are disposed under and across a pair of opposed ends of the platform 10 between the platform and a supporting surface. Although FIG. 2 shows two load cells 12 disposed under and across opposed ends of the platform 10, it is to be understood that any number of load cells may be used in keeping with the practice of the teachings of the present invention. Load cells 12 are old per se, and generally comprise, an elongate bar constructed from a tough alloy steel (typically 4340 heat treated aircraft alloy steel) having a thick center section supporting the weight of the platform 10, shown generally at 13, a plurality of load cell feet 15 disposed at opposite ends of the bar, and a beam 17 between load cell feet 15 and the center section 13 which deflects when weight is applied to the center section. The load cell feet 15 engage a weight distribution means shown generally at 16 and discussed in more detail below, and transfer the weight of the vehicle and load through the weight distribution means to the supporting surface.

A plurality of conventional, resistive-type strain gages (not shown), such as Constantan grids or the like, are bonded to the surface of the load cell at locations on the beam 17 between the Z-shaped lateral support beam 14 and the weight distribution means 16. When a vehicle and load rests on the platform 10, the weight of the vehicle and load deflects or bends the center section of the load cell 13 and the beam 17 causing a change in the resistance within the plurality of strain gages. This change is detected by a conventional summing unit 30 adapted to produce an electrical signal in response to a change in strain gage resistance representing the partial vehicle and load weight. The summing unit 30 typically includes a summing network for adding similar electronic signals from all strain gages disposed on the plurality of load cells 12. The sum of all such electronic signals represents the total weight of the vehicle and load, and may be amplified or converted into other suitable signals within the summing unit 30 and applied to a conventional external indicator (not shown) where the total vehicle and load weight may be displayed. The necessary power and return signal lines to the plurality of strain gages are distributed to the strain gages through a cable (not shown) within each load cell. The gap 34 formed by the separation of the load cell 12 and the weight distribution means 16 is filled with a soft, compressible material, such as rubber foam or the like, adapted to compress when the load cell 12 deforms under the weight of the vehicle and load. The soft, compressible material acts as a means to prevent particles, such as dirt or the like, from affecting the performance of the strain gages.

A Z-shaped lateral support beam 14 having an upper flange shown generally at 14A, and a lower flange shown generally at 14B, extends across a pair of opposed ends of the platform 10. Each Z-shaped lateral support beam 14 is disposed between the platform 10 and the plurality of load cells 12 such that the lower flange 14B of the support beam carries the platform and is secured thereto and the upper flange 14A of the support beam spans the gap between adjacent load cells 12 and rests across the tops thereof. Each Z-shaped lateral support beam 14 is a one piece beam and is extruded from a heat treated aluminum alloy, typically 6061-T6 aluminum alloy. This heat treated aluminum alloy has a stress limit of approximately forty thousand pounds per square inch, and when extruded into the Z-shaped lateral support beam 14, produces a beam with an unusually high strength factor. Other material, such as steel or the like, may be used to form the Z-shaped lateral support beam without departing from the spirit and scope of the present invention.

Figure 3:
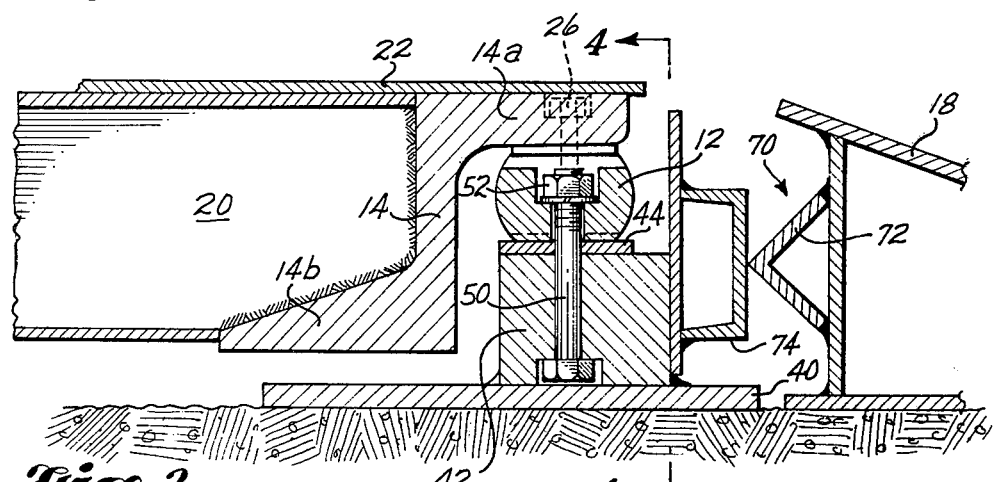
FIG. 3 is an enlarged sectional elevation taken along lines 3—3 in FIG. 2, showing a Z-shaped lateral support beam, load cell, and weight distribution means of a typical load scale according to the present invention.

The plurality of wide flanged beams 20 are carried by the lower flange 14B and are secured thereto typically by welding. As can be seen in FIG. 3, the welds are in low stress areas and are not required to support the entire weight of the vehicle and load. The use of the lower flange 14B to carry the platform 10 overcomes a problem which heretofore had existed in the prior art. For example, in scales of the type wherein an angle member was welded to the wide flanged beams forming the platform with the flange portion of the angle member resting atop the load cells, the welds had to support the entire weight of the vehicle and load. In such a weigh scale, the weld was placed in a high stress area. To accomodate heavier vehicles and loads, the welds would become prohibitively large. Since a limited amount of weld is practical, and since welds are inherently imperfect and can fracture under a high concentrated pressure, a force applied to a localized area of the platform, such as a corner, could cause the welds to fracture and the platform to collapse. The use of the Z-shaped lateral support beam as the primary support for the wide flanged beams 20 places the welds in low stress areas where they are not subject to fracture with the result being that heavier vehicles with heavier loads may be accomodated by the load scales of the present invention. The relative improvement in weighing capability may be recognized by comparing the typical two hundred-fifty thousand pound per platform weighing capacity of scales made according to the present invention with the typical fifty thousand pound per platform weighing capacity of scales existing in the prior art.

Figure 4:
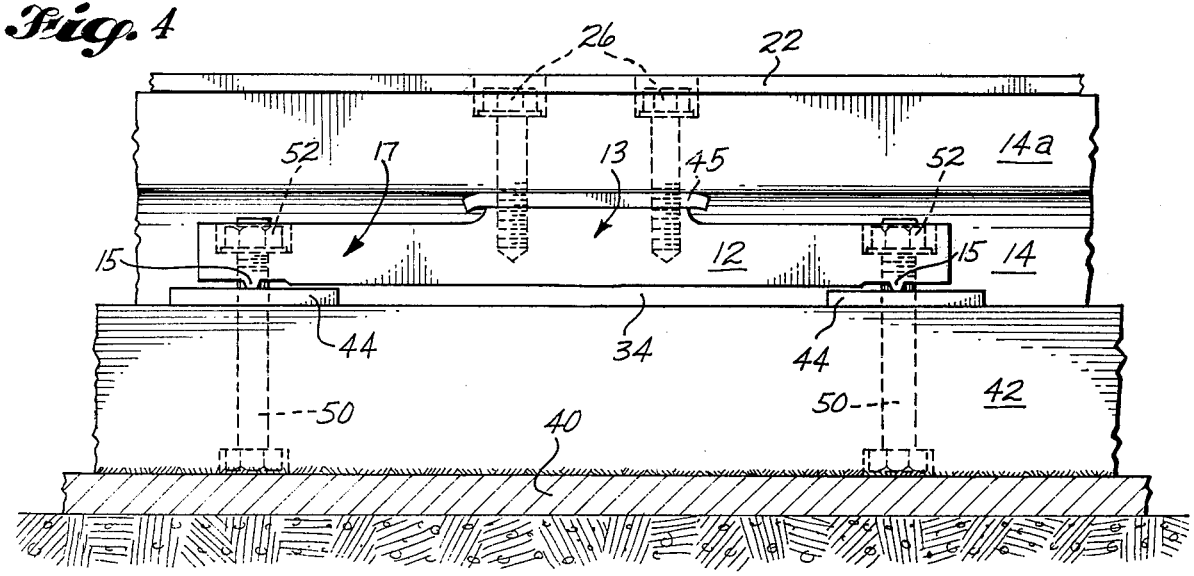
FIG. 4 is an enlarged sectional view taken along lines 4—4 in FIG. 3, showing the load cell and weight distribution means of a typical load scale according to the present invention.

With reference to FIG. 4, a weight distribution means, shown generally at 16, comprises a base plate 40 extending across each end of the platform 10 and supported on a supporting surface such as the earth or a paved road surface. A support bar 42 is disposed upon the base plate 40 and extends across the length thereof, and a plurality of bearing plates 44 are disposed atop the support bar 42 and beneath the plurality of load cell feet 15. Members of the weight distribution means 16 disposed closer to the plurality of load cells are of a smaller horizontal surface area than the members of the weight distribution means disposed closer to the supporting surface. In addition, the members of the weight distribution means disposed closer to the plurality of load cells 12 are of a harder material than the adjacent members disposed closer to the supporting surface. In this manner, the weight distribution means 16 reduces load pressures of about one hundred thousand pounds per square inch existing at bearing plates 44, to a pressure of about one hundred twenty pounds per square inch existing at the supporting surface. Since members of the weight distribution means 16 disposed closer to the load cells 12 are of a harder material than the members disposed closer to the supporting surface, the uppermost members are adapted to transfer pressures to the adjacent members disposed below without deforming the upper members. In the preferred embodiment, the support bar 42 is formed from solid aluminum, with the plurality of bearing plates 44 being formed from a hardened steel alloy. The weight distribution means 16 is secured against lateral movement by a plurality of bolts 50 extending through the support bar 42, the plurality of bearing plates 44, and the load cell 12. A plurality of nuts 52 are threaded to the ends of bolts 50.

In another embodiment, the base plate 40 comprises a first base plate disposed on the supporting surface with a plurality of second base plates being disposed above the first base plate between the first base plate and the bearing plates 44. Each of the second base plates typically is of a smaller horizontal surface area than the first base plate and is separated from the first base plate by a material, such as teflon or the like, which has a non-linear compression characteristic. This type of material becomes increasingly harder and exhibits less compression as the weight applied to the horizontal surface of the material increases. In this manner, when the load scale and load are disposed on a rigid supporting surface such as asphalt, concrete or the like, the concentrated point type load pressures existing on the plurality of second base plates are distributed by the material to the entire horizontal surface area of the first base plate and the supportion surface.

A plurality of spreader plates 45 (see FIG. 4) are disposed between the upper flange 14A of the Z-shaped lateral support beam 14 and the plurality of load cells 12. The spreader plates are of a material, typically steel, which deforms when subject to a compressive force. In this manner, each spreader plate provides a rounded interface between the load cell 12 and the upper flange 14A such that the load cell will not cause wear in the surface of the upper flange when the upper flange spans the gaps between adjacent load cells and rests across the tops thereof.

A plurality of ramp members 18 are disposed upon the supporting surface adjacent the plurality of Z-shaped lateral support beams 14, and provide a means by which the vehicle and load may be easily driven upon the platform 10. As shown in FIG. 3, each ramp member 18 has an elevation above the supporting surface at a point adjacent the Z-shaped lateral support beam 14 at least equal to that of the upper flange 14A. Each ramp member 18 has a plurality of handles 60 disposed on adjacent vertical sides thereof to provide a means to manually position and adjust each ramp member during the weighing operation. The top surface of each ramp member 18 has a tread pattern 24 thereon to provide traction for the vehicle tires as the vehicle is driven onto the platform 10.

Disposed between each ramp member 18 and the Z-shaped lateral support beam 14 is a separation means, shown generally at 70 (see FIG. 3), comprising an angle member 72 disposed upon each ramp member 18, and a skid channel 74 abutting the support bar 42 and rigidly secured to the base plate 40. When a vehicle with a load is driven up the ramp member 18, the ramp member is prevented from contacting either the Z-shaped lateral support beam 14, or the load cell 12 and weight distribution means 16 during the time the vehicle wheel is disposed between the upper surface 22 of platform 10 and the ramp member 18.

The load scale of the present invention, being constructed in part from a high strength aluminum alloy, is lightweight and portable. A typical scale having a vehicle and load weight capacity of two hundred-fifty thousand pounds weighs approximately two thousand five hundred pounds. The platform 10, being typically six feet long and seven feet wide, is small enough to be transported over the highway by a small truck or the like with a minimum of special equipment. If for example, the ramp members are not available at a remote off-road site, the typically low elevation of the scale with respect to the supporting surface permits simple dirt ramps to be formed at a pair of opposed ends of the scale thereby allowing the vehicle and its corresponding load to be placed on the platform.

To facilitate transporting the scale, a plurality of shackles 76 with shackle bosses 78 disposed therein are disposed at each corner of the scale thereby permitting the scale to be loaded as by hoist, forklift, or the like.

Industrial Applicability

The present invention has industrial application in any situation where it is necessary to weigh large loads. It is particularly well adapted to weigh large vehicles such as mining trucks, bottom scrappers or the like, and large loads such as are carried by crane outriggers.

We claim:

1. In a load scale of the type wherein a platform supporting a vehicle and load to be weighed has a plurality of load cells disposed under and across a pair of opposed ends thereof and between said platform and a supporting surface, the improvement comprising a plurality of Z-shaped lateral support beams having an upper flange and a lower flange thereon and extending across each end of said pair of opposed ends of said platform between said platform and said plurality of load cells with said lower flange extending under a portion of said platform, said lower flange carrying same by a region on said beam being relatively massive thereby reducing the total stress in the area on said beam carrying said platform and being secured to said platform in a region on said beam where forces reacted by the means securing same are low enabling said load scale to carry substantially large loads, and wherein the upper flange of said support beams spans the gap between adjacent load cells and rests across the tops thereon.

2. The load scale of claim 1 further including a spreader plate disposed between said upper flange of said Z-shaped lateral support beam and each of said load cells, said spreader plate being of a material adapted to deform such that said load cell will not cause wear to said upper flange of said lateral support beam when said upper flange spans the gap between adjacent load cells and rests across the tops thereon.

3. The load scale of claim 1 wherein said platform comprises a plurality of wide flanged beams disposed adjacent each other in a plane such that the edges of the flanges of one beam abut the edges of the flanges of the adjacent beam.

4. The load scale of claim 1 wherein said platform comprises a plurality of wide flange beams disposed adjacent each other in a plane with a separation between adjacent beams and the flanges thereon.

5. The load scale of claim 1 wherein said platform has an upper surface thereon with a portion of said upper surface extending over said Z-shaped lateral support beam upper flange and being in contact therewith.

6. The load scale of claim 1 wherein said Z-shaped lateral support beam is a one-piece beam.

7. The load scale of claim 6 wherein said beam is extruded from heat treated aluminum.

8. The load scale of claim 1 wherein said plurality of load cells are supported on said supporting surface by a weight distribution means wherein members of said means disposed closer to said load cells are of a smaller horizontal surface area than members disposed closer to said supporting surface.

9. The load scale of claim 8 wherein said members of said weight distribution means disposed closer to said load cells are of a harder material than adjacent members disposed closer to said supporting surface.

10. The load scale of claim 8 wherein said weight distribution means has a first base plate disposed upon said supporting surface with a plurality of second baseplates being disposed above said base plate and being separated therefrom by a sheet of material having a non-linear compression characteristic.

11. The load scale of claim 1 further including a plurality of ramp members disposed upon said supporting surface adjacent said plurality of Z-shaped lateral support beams, with each ramp member having an elevation above said supporting surface adjacent said Z-shaped lateral support beam of at least that of said upper flange of said lateral support beam.

12. The load scale of claim 11 wherein each ramp member has a plurality of handles disposed on adjacent vertical sides thereof.

13. The load scale of claim 11 further including a separation means disposed between said ramp members and said Z-shaped lateral support beams, said separation means preventing said ramp members from contacting said beam as a vehicle having a load to be weighed moves on said ramp member and said platform.

14. A load scale having a platform and a plurality of load cells disposed under and across a pair of opposed ends thereof and between said platform and a supporting surface comprising:

(a) a plurality of Z-shaped lateral support beams extending across each end of said pair of opposed ends of said platform, said Z-shaped beam having an upper flange and a lower flange thereon and being disposed between said platform and said load cells with said lower flange extending under a portion of the platform, said lower flange carrying same by a region on said beam being relatively massive thereby reducing the total stress in the area on said beam carrying said platform, and being secured to said platform in a region on said beam where forces reacted by the means securing same are low enabling said load scale to carry substantially large loads, and wherein said upper flange of said beam spans the gap between adjacent load cells and rests across the tops thereon; and, (b) a plurality of weight distribution means disposed between said supporting surface and said plurality of load cells, wherein members of said means disposed closer to said load cells are of a harder material than members disposed closer to said supporting surface.

15. The load scale of claim 14 wherein said Z-shaped lateral support beam is a one piece beam.

16. The load scale of claim 14 wherein said beam is extruded from heat treated aluminum.

17. The load scale of claim 14 wherein said members of said weight distribution means disposed closer to said load cells are of a smaller horizontal surface area than adjacent members disposed closer to said supporting surface.

18. The load scale of claim 14 wherein said weight distribution means has a first base plate disposed upon said supporting surface with a plurality of second base plates being disposed above said first base plate and being separated therefrom by a sheet of material having a non-linear compression characteristic.

19. The load scale of claim 14 further including a spreader plate disposed between said upper flange of said Z-shaped lateral support beam and each of said load cells, said spreader plate being of a material adapted to deform such that said load cells will not cause wear to said upper flange of said lateral support beam when said upper flange spans the gap between adjacent load cells and rests across the tops thereof.

20. The load scale of claim 14 wherein said platform comprises a plurality of wide flanged beams disposed adjacent each other in a plane such that the edges of the flanges of on beam abut the edges of the flanges of the adjacent beam.

21. The load scale of claim 14, wherein said platform comprises a plurality of wide flanged beams disposed adjacent each other in a plane with separation between adjacent beams and the flanges thereon.

22. The load scale of claim 14 wherein said platform has an upper surface thereon with a portion of said upper surface extending over said Z-shaped lateral support beam upper flange and being in contact therewith.

23. The load scale of claim 14 further including a plurality of ramp members disposed upon said supporting surface adjacent said plurality of Z-shaped lateral support beams, with each ramp member having an elevation above said supporting surface adjacent said Z-shaped lateral support beam of at least that of said upper flange of said lateral support beam.

24. The load scale of claim 23 wherein each ramp member has a plurality of handles disposed on adjacent vertical sides thereof.

25. The load scale of claim 23 further including a separation means disposed between said ramp members and said Z-shaped lateral support beams, said separation means preventing said ramp members from contacting said beam as a vehicle having a load to be weighed moves on said ramp member and said platform.

* * * * *